US012221812B2

(12) United States Patent
Xu et al.

(10) Patent No.: US 12,221,812 B2
(45) Date of Patent: Feb. 11, 2025

(54) DRAWER INTERLOCKING GUIDE RAIL WITH LOCKING FUNCTION

(71) Applicant: QINGYUAN SACA PRECISION MANUFACTURING CO., LTD., Guangdong (CN)

(72) Inventors: Huaike Xu, Guangdong (CN); Gengxi Cai, Guangdong (CN)

(73) Assignee: Qingyuan SACA Precision Manufacturing Co., Ltd., Guangdong (CN)

( * ) Notice: Subject to any disclaimer, the term of this patent is extended or adjusted under 35 U.S.C. 154(b) by 35 days.

(21) Appl. No.: 17/976,956

(22) Filed: Oct. 31, 2022

(65) Prior Publication Data

US 2024/0081528 A1 Mar. 14, 2024

(30) Foreign Application Priority Data

Sep. 8, 2022 (CN) ......................... 202211097965.8

(51) Int. Cl.
*E05B 65/46* (2017.01)
*A47B 88/00* (2017.01)
(Continued)

(52) U.S. Cl.
CPC .......... *E05B 65/464* (2013.01); *A47B 88/443* (2017.01); *A47B 88/477* (2017.01);
(Continued)

(58) Field of Classification Search
CPC .... E05B 65/464; E05B 65/463; E05B 65/462; E05B 65/46; A47B 88/443;
(Continued)

(56) References Cited

U.S. PATENT DOCUMENTS

| | | | | |
|---|---|---|---|---|
| 6,382,751 B1 * | 5/2002 | Chiu | .................... | A47B 88/477 312/334.46 |
| 11,089,872 B1 * | 8/2021 | Chen | ...................... | A47B 88/49 |

(Continued)

FOREIGN PATENT DOCUMENTS

| | | | |
|---|---|---|---|
| CN | 112932119 A * | 6/2021 | ............. A47B 88/40 |
| CN | 115104867 A * | 9/2022 | |

(Continued)

*Primary Examiner* — Kimberley S Wright
(74) *Attorney, Agent, or Firm* — Ming Jiang; OPENTO US LLC

(57) ABSTRACT

A drawer interlocking guide rail with locking function, including guide rail assemblies including an inner rail, an outer rail and a middle rail and an interlocking device including an interlocking base, an interlocking slider and a rotating arm; the interlocking base is slidably mounted on the outer rail from an outside; the interlocking slider is nested on the interlocking base and have special-shaped hole passing through the rotating arm; the interlocking base is provided with a chute portion, the inner rail is provided with a toggle block; the end of the inner rail is provided with a tail clamping portion; the end of the outer rail is provided with a silencer locking stopper for fitting to the tail clamping portion when the drawer is closed, two sides of the outer rail are respectively installed with interlocking linkage assemblies driven by the interlocking slider to move up and down.

15 Claims, 6 Drawing Sheets

(51) Int. Cl.

| | |
|---|---|
| ***A47B 88/443*** | (2017.01) |
| ***A47B 88/477*** | (2017.01) |
| ***A47B 88/483*** | (2017.01) |
| ***A47B 88/50*** | (2017.01) |
| ***E05B 65/463*** | (2017.01) |
| ***E05B 65/464*** | (2017.01) |
| *A47B 97/00* | (2006.01) |

(52) U.S. Cl.

CPC .............. *A47B 88/50* (2017.01); *E05B 65/46* (2013.01); *A47B 2097/008* (2013.01)

(58) Field of Classification Search

CPC . A47B 88/477; A47B 88/50; A47B 2097/008; A47B 88/467; A47B 88/40; A47B 88/43

See application file for complete search history.

(56) References Cited

U.S. PATENT DOCUMENTS

| | | | | |
|---|---|---|---|---|
| 11,266,239 | B1 * | 3/2022 | Chen .................... | A47B 88/477 |
| 2008/0061663 | A1 * | 3/2008 | Wu ....................... | E05B 65/463 312/333 |
| 2017/0007020 | A1 * | 1/2017 | McElveen ............ | A47B 88/483 |
| 2019/0239645 | A1 * | 8/2019 | Stöckli ................. | A47B 88/467 |

FOREIGN PATENT DOCUMENTS

| | | | | | |
|---|---|---|---|---|---|
| CN | 218438803 | U | * | 2/2023 | |
| TW | 201402045 | A | * | 1/2014 | ........... G02B 5/0221 |

* cited by examiner

DRAWER INTERLOCKING GUIDE RAIL WITH LOCKING FUNCTION

FIELD

The present disclosure relates to the technical field of drawer guide, in particular to drawer interlocking guide rail with locking function.

BACKGROUND

In a family, furniture is an essential daily product; there are multiple drawers in a cabinet. When multiple drawers are pulled out at the same time, the cabinet has the risk of tipping over. Therefore, in order to solve this tipping risk, there are guide rails with interlocking function on the market. The function of this guide rail is: when one drawer is pulled out, the interlocking function of the guide rail is used, and other drawers are locked and cannot be pulled out. That is to say, only one drawer can be pulled out at a time, and multiple drawers cannot be pulled out at the same time. However, in addition to the interlocking function, the guide rails that appear on the market also have the function of self-locking. When the drawer is automatically closed under the action of the spring, there will be a "bang" sound when the drawer is closed, especially in the night. This will affect sleep, especially in children's rooms, so it is necessary to develop a guide rail with only an interlock function to meet specific occasions.

This patent provides a technical solution for solving the interlocking function guide rail that makes a sound when closing, which not only solves the risk of the cabinet tipping over, but also solves the problem of sound, and is especially suitable for children's furniture for families.

SUMMARY

The purpose of the present disclosure is to overcome the deficiencies of the prior art and provide an a drawer interlocking guide rail with locking function, which has a simple structure, solves the problem that multiple drawers can be pulled out at the same time, prevents overturning, and also solves the problem of abnormal noise when the drawer closing.

The purpose of the invention of the present disclosure is achieved as follows:

The present disclosure provides a drawer interlocking guide rail with locking function, comprising multiple groups of guide rail assemblies for opening and closing drawers and an interlocking device for interlocking or unlocking the multiple groups of guide rail assemblies, the guide rail assembly comprises an inner rail, an outer rail and a middle rail for connecting the inner rail and the outer rail respectively, wherein the interlocking device comprises an interlocking base, an interlocking slider, and a rotating arm, the interlocking base is slidably mounted on an end of the outer rail from an outside, the interlocking slider is nested on the interlocking base and its special-shaped hole passes through the rotating arm, the interlocking base is provided with a chute portion, the inner rail is provided with a toggle block, and the toggle block is clamped with the rotating arm when the drawer is closed, or drives the rotating arm to slide in the chute portion when the drawer is opened and is configured for unlocking by rotating at an inclined opening of the chute portion, the end of the inner rail is provided with a tail clamping portion, the end of the outer rail is provided with a silencer locking stopper for matching and clamping with the tail clamping portion when the drawer is closed, two sides of the outer rail are respectively installed with interlocking linkage assemblies; the interlocking slider slides to drive the interlocking linkage assemblies to move up and down, thereby realizing an interlocking function.

It is optimized according to the above-mentioned embodiment, the end of the outer rail is integrally formed with a clamping hook for clamping with the silencer locking stopper; the silencer locking stopper is arranged as the silencer locking stopper rubber used for elastic snap connection or deformation separation with the tail clamping portion.

It is optimized according to the above-mentioned embodiment, an upper end surface and a lower end surface of the rotating arm are respectively have an upper connecting column and a lower connecting column, the upper connecting post passes through the special-shaped hole and is oscillatingly connected to the special-shaped hole along with the interlocking slider slides, the lower connecting column slides on the chute portion and its inclined opening along with the interlocking slider.

It is optimized according to the above-mentioned embodiment, the interlocking slider is provided with an orientation hole for the rotating arm to swing to freely snap into the toggle block or come out of the toggle block, the rotating arm is provided with an orientation shaft for matching with the orientation hole for installation.

It is optimized according to the above-mentioned embodiment, the interlocking linkage assembly comprises an interlocking slider and a push rod, the interlocking slider slides up and down on the interlocking base, and an upper end of the interlocking slider is provided with a slot for inserting the push rod, a lower end of the interlocking slider is provided with a connecting boss for locking the interlocking slider or unlocking the interlocking slider by sliding up and down.

It is optimized according to the above-mentioned embodiment, a front end of the interlocking slider is provided with an inclined surface for pushing the interlocking slider to move up and down, the interlocking slider is provided with an inclined connecting surface for sliding connection or sliding separation with the inclined surface.

It is optimized according to the above-mentioned embodiment, an end of the interlocking slider is provided with a barb used for interlocking buckle or interlocking unbuckle, the barb slides at the interlocking base along with the interlocking slider.

It is optimized according to the above-mentioned embodiment, the left and right sides of the outer rail are respectively formed with notches for assembling the interlocking slider, the left and right sides of the interlocking base are respectively provided with limit guide groove for limiting the up and down movement of the interlocking slider.

It is optimized according to the above-mentioned embodiment, a front end of the interlocking base is provided with a silencer elastic block that is in contact with the middle rail.

It is optimized according to the above-mentioned embodiment, a front end of the middle rail is provided with a front stopper, a rear end of the inner rail (11) is provided with a rear rubber which is combined with the front stopper to limit the stretching length of the inner rail.

The advantages of the present disclosure are:

By using the interlocking device of the structure, the structure is simple, the assembly is convenient, the interlocking function can be realized, the problem that a plurality of drawers can be pulled out at the same time is solved, and the overturning is prevented.

The locking function is realized by the structure of the tail clamping portion and the silencer locking stopper. At the same time, under the characteristics of the silencer locking stopper, the problem of abnormal noise when the drawer is closed can be solved, and the noise reduction effect is good.

DETAILED DESCRIPTION OF THE DISCLOSURE

The present disclosure is further described below with reference to the drawings.

Figure 1:
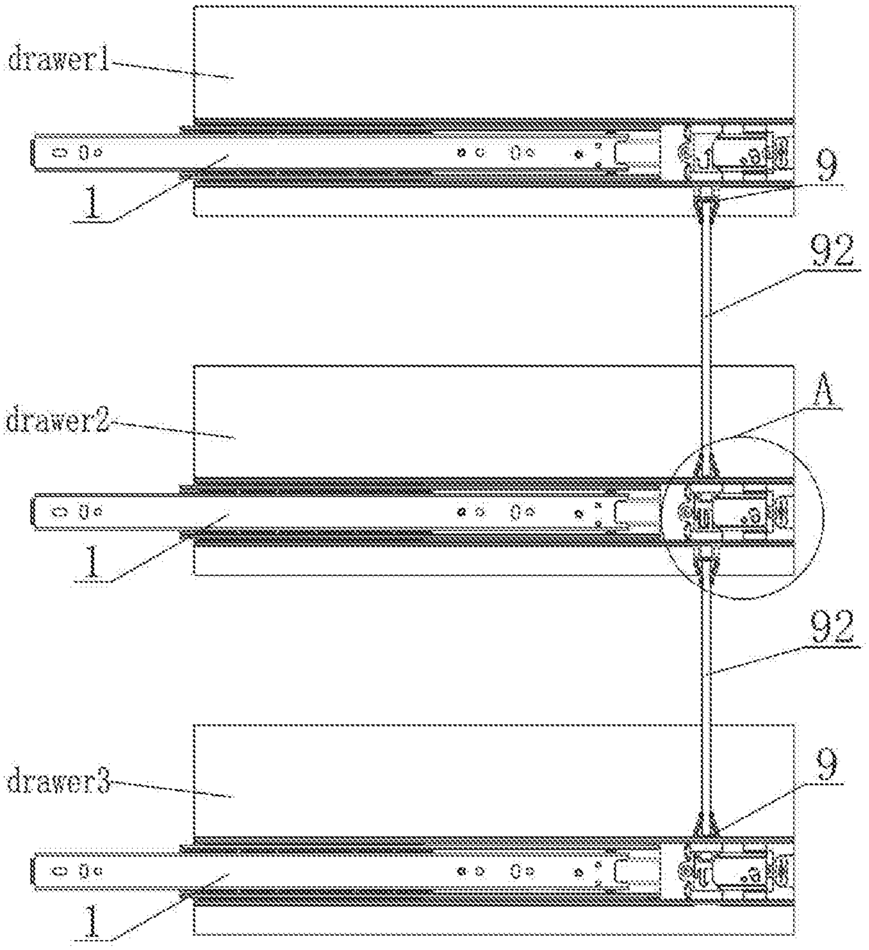
FIG. 1 is a schematic structural diagram of a preferred embodiment of the present disclosure.
Figure 2:
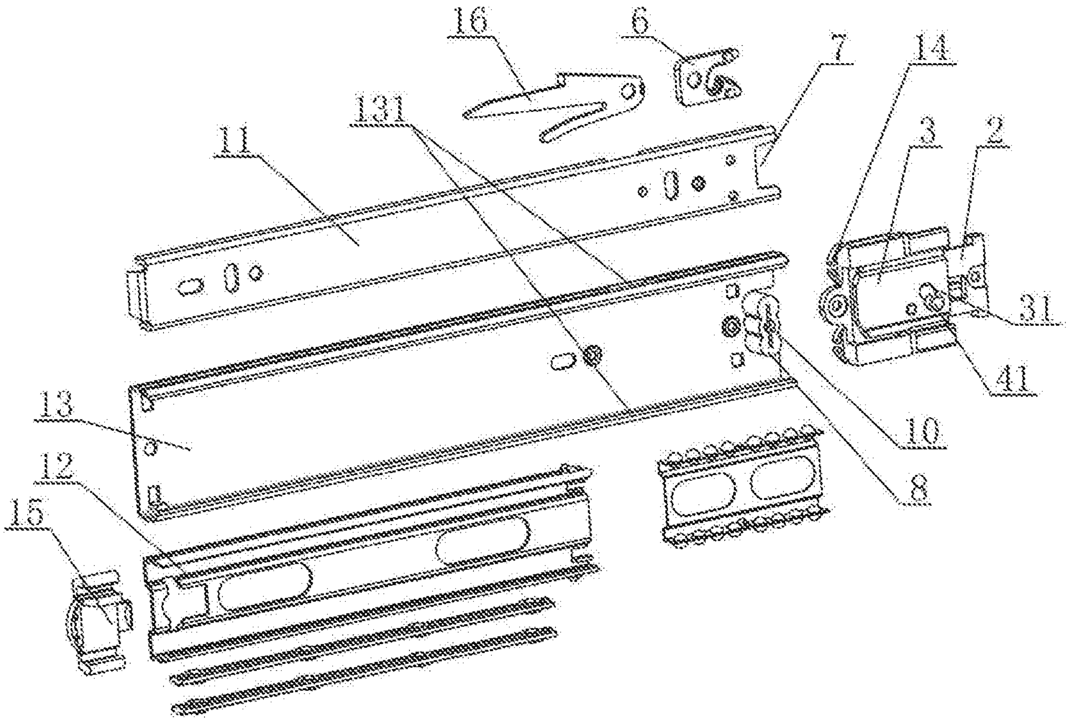
FIG. 2 an exploded view of a preferred embodiment of the present disclosure.
Figure 3:
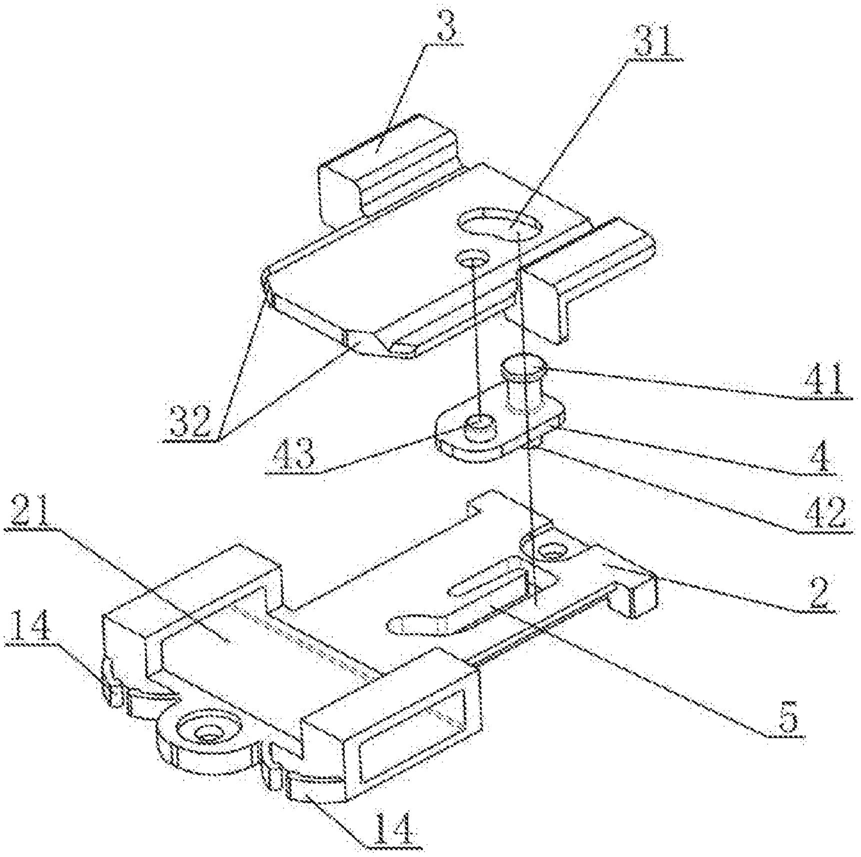
FIG. 3 an exploded view of an interlocking device according to a preferred embodiment of the present disclosure.
Figure 4:
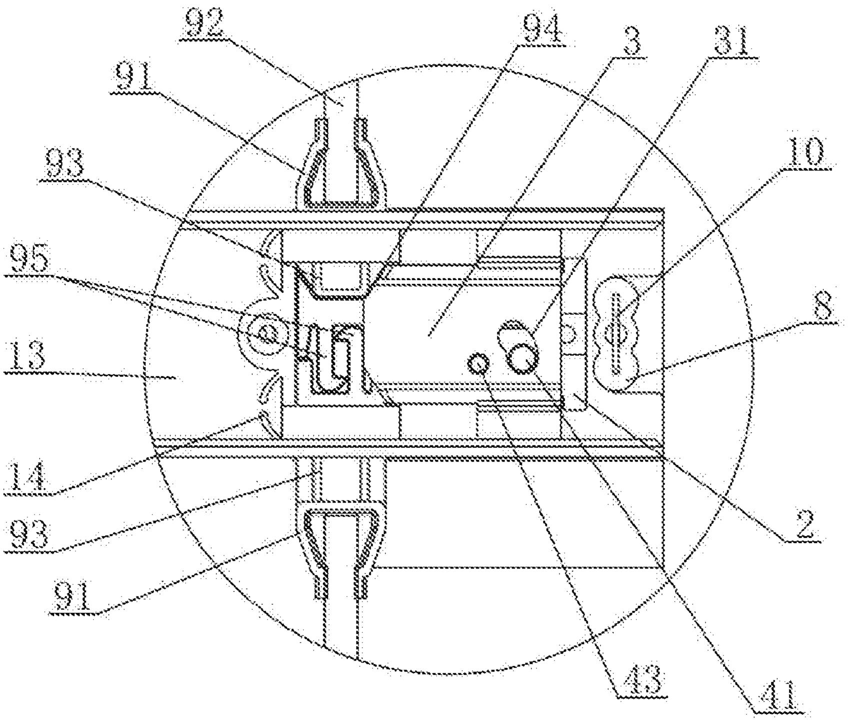
FIG. 4 is an enlarged view of A in FIG. 1 of the preferred embodiment of the present disclosure.
Figure 5:
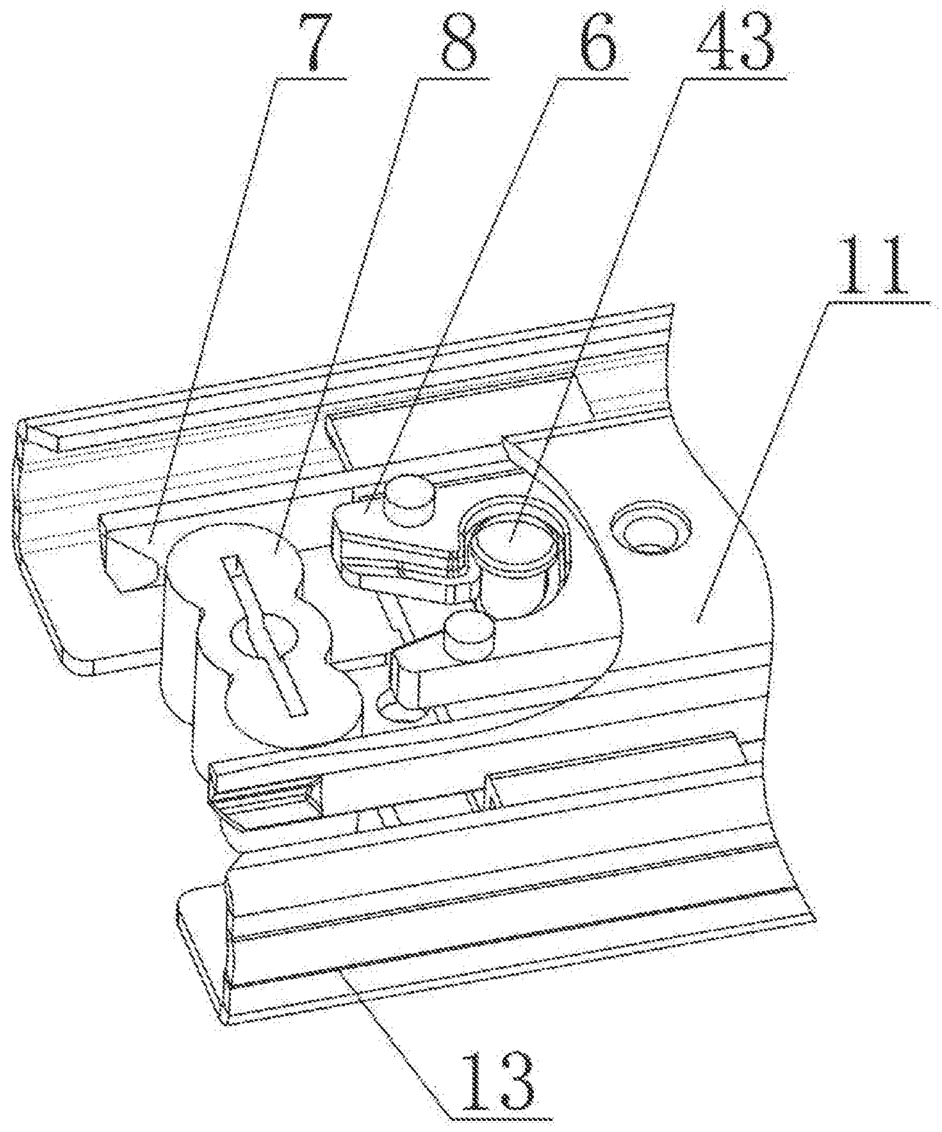
FIG. 5 is a partially cut and enlarged view of a preferred embodiment of the present disclosure.
Figure 6:
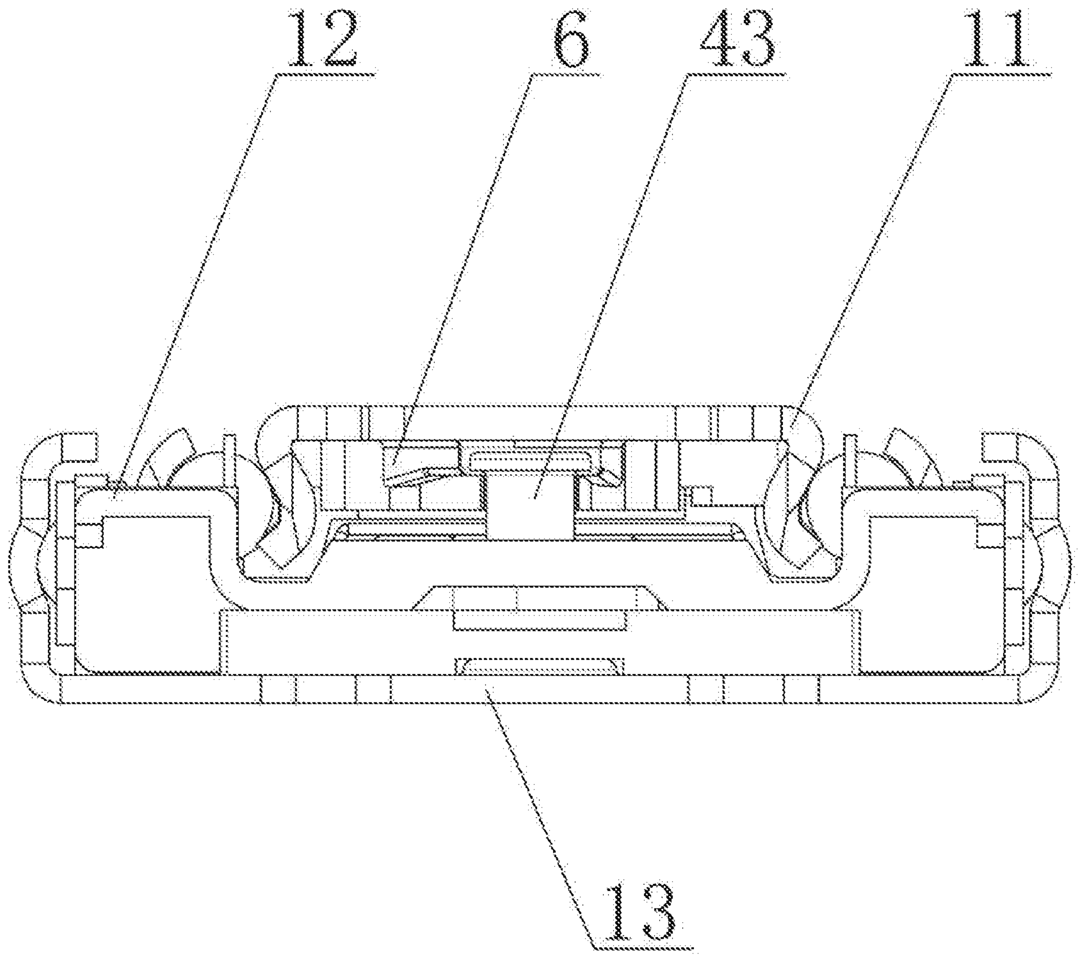
FIG. 6 is a schematic structural diagram of the buckle of the rotating arm according to a preferred embodiment of the present disclosure.

As shown in FIGS. 1 to 6, a drawer interlocking guide rail with locking function of the present disclosure, comprises multiple groups of guide rail assemblies 1 for opening and closing drawers 1 and an interlocking device for interlocking or unlocking the multiple groups of guide rail assemblies, the guide rail assembly 1 comprises an inner rail 11, an outer rail 13 and a middle rail 12 for connecting the inner rail 11 and the outer rail 13 respectively, wherein the interlocking device comprises an interlocking base 2, an interlocking slider 3, and a rotating arm 4, the interlocking base 2 is slidably mounted on an end of the outer rail 13 from an outside, the interlocking slider 3 is nested on the interlocking base 2 and its special-shaped hole 31 passes through the rotating arm 4, the interlocking base 2 is provided with a chute portion 5, the inner rail 11 is provided with a toggle block 6, and the toggle block 6 is clamped with the rotating arm 4 when the drawer is closed, or drives the rotating arm 4 to slide in the chute portion 5 when the drawer is opened and is configured for unlocking by rotating at an inclined opening of the chute portion 5, the end of the inner rail 11 is provided with a tail clamping portion 7, the end of the outer rail 13 is provided with a silencer locking stopper 8 for matching and clamping with the tail clamping portion 7 when the drawer is closed.

As shown in FIGS. 1 to 6, further preferably, an upper end surface and a lower end surface of the rotating arm 4 are respectively have an upper connecting column 41 and a lower connecting column 42, the upper connecting post 41 passes through the special-shaped hole 31 and is oscillatingly connected to the special-shaped hole 31 along with the interlocking slider 3 slides, the lower connecting column 42 slides on the chute portion 5 and its inclined opening along with the interlocking slider 3.

And the interlocking slider 3 is provided with an orientation hole for the rotating arm 4 to swing to freely snap into the toggle block 6 or come out of the toggle block 6, the rotating arm 4 is provided with an orientation shaft 43 for matching with the orientation hole for installation.

That is, when the drawer is pulled out, under sufficient pulling force, the silencer locking stopper rubber is deformed so that the tail clamping portion 7 of the inner rail 11 is separated from the silencer locking stopper rubber. Immediately, the inner rail 11 drives the rotating arm 4, so that the lower connecting column 42 slides outward in the chute portion 5, and reaches the inclined opening of the chute portion 5; the upper connecting column 41 swings on the special-shaped hole 31 to disengage the toggle block 6, so that the upper connecting column 41 is separated from the inner rail 11; the rotating arm 4 is unlocked so that the inner rail 11 continues to open, so the guide rail assembly 1 is fully opened. When the drawer is closed again, the inner rail 11 pushes the middle rail 12 to move inward, and the toggle block 6 of the inner rail 11 contacts the upper connecting column 41, so that the rotating arm 4 is reset to swing, and the upper connecting column 41 is snapped in the slot of the toggle block 6, thus, the toggle block 6 drives the rotating arm 4 to move. During this time, the lower connecting column 42 is separated from the inclined opening of the chute portion 5 and slides on the chute portion 5. When the drawer is closed, with enough pushing force, the tail clamping portion 7 snaps onto the silencer locking stopper rubber. In this way, the locking function is realized through the cooperation of the structure of the tail clamping portion 7 and the silencer locking stopper 8.

At the same time, the end of the outer rail 13 is integrally formed with a clamping hook 10 for clamping with the silencer locking stopper 8, the silencer locking stopper 8 is arranged as the silencer locking stopper rubber used for elastic snap connection or deformation separation with the tail clamping portion 7. It is easy to assemble, has a stable structure, and can solve the problem of abnormal noise when the drawer is closed, and has a good noise reduction effect.

In addition, a front end of the interlocking base 2 is provided with a silencer elastic block 14 contacting the middle rail 12, a front end of the middle rail 12 is provided with a front stopper 15, and a rear end of the inner rail 11 is provided with a rear rubber 16 for restricting the stretching length of the inner rail 11 in combination with the front stopper 15.

By cooperating with the structure of the silencer elastic block 14, the front stopper 15 and the rear rubber 16, the noise during the opening and closing of the guide rail assembly 1 can be further reduced, the noise reduction effect can be improved, and the quality of the product can be ensured.

As shown in FIGS. 1 to 6, two sides of the outer rail 13 are respectively installed with interlocking linkage assemblies 9; the interlocking slider 3 slides to drive the interlocking linkage assemblies 9 to move up and down, thereby realizing an interlocking function.

Wherein, the interlocking linkage assembly 9 comprises an interlocking slider 91 and a push rod 92, the interlocking slider 91 slides up and down on the interlocking base 2, and an upper end of the interlocking slider 91 is provided with a slot for inserting the push rod 92, a lower end of the interlocking slider 91 is provided with a connecting boss 93 for locking the interlocking slider 3 or unlocking the interlocking slider 3 by sliding up and down.

In practical applications, the left and right sides of the outer rail 13 are respectively provided with notches 131 for assembling the interlocking slider 91; the left and right sides of the interlocking base 2 are respectively provided with limit guide groove 21 for limiting the up and down movement of the interlocking slider 91. This facilitates assembly and improves the operational stability of the interlocking slider 91.

In addition, a front end of the interlocking slider 3 is provided with an inclined surface 32 for pushing the interlocking slider 91 to move up and down, the interlocking slider 91 is provided with an inclined connecting surface 94 for sliding connection or sliding separation with the inclined surface 32.

Furthermore, an end of the interlocking slider 91 is provided with a barb 95 used for interlocking buckle or interlocking unbuckle, the barb 95 slides at the interlocking base 2 along with the interlocking slider 91.

The cabinet of this structure can be provided with three groups, four groups, five groups or more than five groups of drawers. Now take three groups of drawers as an example. Each group of the guide rail assembly 1 is assembled on the drawer according to a certain equal spacing.

When in use, when all the drawers are closed, all the interlocking sliders 91 are all in a sliding state due to the action of gravity, so that the connecting bosses 93 of the second group and the third group of the interlocking sliders 91 are closed on the limit guide groove 21 to lock the corresponding interlocking sliders 3. So that the guide rail assemblies 1 of the second group and the third group of drawers are in a locked state, only the guide rail assembly 1 of the first group of drawers is unlocked. When the third group of drawers is pulled out, the interlocking slider 3 slides out laterally along with the inner rail 11 of the third group of guide rail assembly 1, and make the interlocking slider 3 of the third group have enough tension to slide the inclined connecting surface 94 upward along the inclined surface 32, so that the corresponding interlocking slider 91 is pushed up, then open the limit guide groove 21 of the third group, and the guide rail assembly 1 of the third group can be unlocked and pulled out. During this period, under the linkage of the push rod 92, the interlocking sliders 91 of the second group and the first group are moved up respectively, so that the connecting bosses 93 of the second group and the first group closes the corresponding limit guide groove 21, thereby the guide rail assemblies 1 of the second group, the first group are locked. Similarly, when the second group of drawers is pulled out, the interlocking slider 3 of the second group slides out along with the inner rail 11 and the upper interlocking slider 91 of the second group is pushed up with sufficient pulling force, thereby the limit guide groove 21 of the second group is opened, so that the guide rail assembly 1 of the second group is unlocked and can be pulled out. At this time, under the linkage of the push rod 92, push the interlocking sliders 91 of the first group and the third group to slide, so that the connecting bosses 93 of the first group and the third group close the corresponding limit guide grooves 21. Thus, the guide rail assemblies 1 of the first group and the third group are locked.

In this way, under the interlocking action of the interlocking components, only one drawer can be pulled out at a time, solving the problem that multiple drawers can be pulled out at the same time, preventing overturning, increasing the safety of use, and ensuring the quality of the product.

The above-mentioned specific embodiments are only specific implementations with better effects of the present disclosure, and all structures that are the same as or equivalent to the drawer interlocking guide rail with locking function of the present disclosure are within the protection scope of the present disclosure.

What is claimed is:

1. A drawer interlocking guide rail with locking function, comprising multiple groups of guide rail assemblies (1) for opening and closing drawers and an interlocking device for interlocking or unlocking the multiple groups of guide rail assemblies (1), the guide rail assembly (1) comprises an inner rail (11), an outer rail (13) and a middle rail (12) for connecting the inner rail (11) and the outer rail (13) respectively, wherein the interlocking device comprises an interlocking base (2), a first interlocking slider (3), and a rotating arm (4), the interlocking base (2) is slidably mounted on an end of the outer rail (13) from an outside, the first interlocking slider (3) is nested on the interlocking base (2) and have a special-shaped hole (31) passing through the rotating arm (4), the interlocking base (2) is provided with a chute portion (5), the inner rail (11) is provided with a toggle block (6), and the toggle block (6) is clamped with the rotating arm (4) when the drawer is closed, or drives the rotating arm (4) to slide in the chute portion (5) when the drawer is opened, and is configured for unlocking by rotating at an inclined opening of the chute portion (5), an end of the inner rail (11) is provided with a tail clamping portion (7), the end of the outer rail (13) is provided with a silencer locking stopper (8) for matching and clamping with the tail clamping portion (7) when the drawer is closed, two sides of the outer rail (13) are respectively installed with interlocking linkage assemblies (9); the first interlocking slider (3) slides to drive the interlocking linkage assemblies (9) to move up and down, thereby realizing an interlocking function, an upper end surface and a lower end surface of the rotating arm (4) are respectively have an upper connecting column (41) and a lower connecting column (42), the upper connecting post (41) passes through the special-shaped hole (31) and is oscillatingly connected to the special-shaped hole (31) as the first interlocking slider (3) slides, the lower connecting column (42) slides on the chute portion (5) and the inclined opening along with the first interlocking slider (3), the first interlocking slider (3) is provided with an orientation hole for the rotating arm (4) to swing to freely snap into the toggle block (6) or come out of the toggle block (6), the rotating arm (4) is provided with an orientation shaft (43) for fitting to the orientation hole for installation.

2. The drawer interlocking guide rail with locking function according to claim 1, wherein the end of the outer rail (13) is integrally formed with a clamping hook (10) for clamping with the silencer locking stopper (8), the silencer locking stopper (8) is arranged as a silencer locking stopper rubber used for elastic snap connection or deformation separation with the tail clamping portion (7).

3. The drawer interlocking guide rail with locking function according to claim 1, wherein the interlocking linkage assembly (9) comprises a second interlocking slider (91) and a push rod (92), the second interlocking slider (91) slides up and down on the interlocking base (2), and an upper end of the second interlocking slider (91) is provided with a slot for inserting the push rod (92), a lower end of the second interlocking slider (91) is provided with a connecting boss (93) for locking the first interlocking slider (3) or unlocking the first interlocking slider (3) by sliding up and down.

4. The drawer interlocking guide rail with locking function according to claim 3, wherein a front end of the first interlocking slider (3) is provided with an inclined surface (32) for pushing the second interlocking slider (91) to move up and down, the second interlocking slider (91) is provided with an inclined connecting surface (94) for sliding connection or sliding separation with the inclined surface (32).

5. The drawer interlocking guide rail with locking function according to claim 3, wherein an end of the second interlocking slider (91) is provided with a barb (95) used for interlocking buckle or interlocking unbuckle, the barb (95) slides at the interlocking base (2) along with the second interlocking slider (91).

6. The drawer interlocking guide rail with locking function according to claim 3, wherein a left and right sides of the outer rail (13) are respectively formed with notches (131) for assembling the second interlocking slider (91), a left and right sides of the interlocking base (2) are respectively provided with limit guide groove (21) for limiting an up and down movement of the second interlocking slider (91).

7. The drawer interlocking guide rail with locking function according to claim 1, wherein a front end of the interlocking base (2) is provided with a silencer elastic block (14) that is in contact with the middle rail (12).

8. The drawer interlocking guide rail with locking function according to claim 1, wherein a front end of the middle rail (12) is provided with a front stopper (15), a rear end of the inner rail (11) is provided with a rear rubber (16) which is combined with the front stopper (15) to limit a stretching length of the inner rail (11).

9. The drawer interlocking guide rail with locking function according to claim 2, wherein a front end of the middle rail (12) is provided with a front stopper (15), a rear end of the inner rail (11) is provided with a rear rubber (16) which is combined with the front stopper (15) to limit a stretching length of the inner rail (11).

10. The drawer interlocking guide rail with locking function according to claim 1, wherein a front end of the middle rail (12) is provided with a front stopper (15), a rear end of the inner rail (11) is provided with a rear rubber (16) which is combined with the front stopper (15) to limit a stretching length of the inner rail (11).

11. The drawer interlocking guide rail with locking function according to claim 1, wherein a front end of the middle rail (12) is provided with a front stopper (15), a rear end of the inner rail (11) is provided with a rear rubber (16) which is combined with the front stopper (15) to limit a stretching length of the inner rail (11).

12. The drawer interlocking guide rail with locking function according to claim 3, wherein a front end of the middle rail (12) is provided with a front stopper (15), a rear end of the inner rail (11) is provided with a rear rubber (16) which is combined with the front stopper (15) to limit a stretching length of the inner rail (11).

13. The drawer interlocking guide rail with locking function according to claim 4, wherein a front end of the middle rail (12) is provided with a front stopper (15), a rear end of the inner rail (11) is provided with a rear rubber (16) which is combined with the front stopper (15) to limit a stretching length of the inner rail (11).

14. The drawer interlocking guide rail with locking function according to claim 5, wherein a front end of the middle rail (12) is provided with a front stopper (15), a rear end of the inner rail (11) is provided with a rear rubber (16) which is combined with the front stopper (15) to limit a stretching length of the inner rail (11).

15. The drawer interlocking guide rail with locking function according to claim 6, wherein a front end of the middle rail (12) is provided with a front stopper (15), a rear end of the inner rail (11) is provided with a rear rubber (16) which is combined with the front stopper (15) to limit a stretching length of the inner rail (11).

* * * * *